(12) United States Patent
Rizzardini et al.

(10) Patent No.: US 12,535,389 B2
(45) Date of Patent: Jan. 27, 2026

(54) SENSOR UNIT WITH ON-DEVICE LEARNING AND ANOMALY DETECTION

(71) Applicant: STMicroelectronics International N.V., Geneva (CH)

(72) Inventors: Federico Rizzardini, Settimo Milanese (IT); Lorenzo Bracco, Chivasso (IT)

(73) Assignee: STMicroelectronics International N.V., Geneva (CH)

( * ) Notice: Subject to any disclaimer, the term of this patent is extended or adjusted under 35 U.S.C. 154(b) by 444 days.

(21) Appl. No.: 18/161,674

(22) Filed: Jan. 30, 2023

(65) Prior Publication Data

US 2024/0255386 A1    Aug. 1, 2024

(51) Int. Cl.
*G01M 99/00* (2011.01)
*G06N 20/00* (2019.01)

(52) U.S. Cl.
CPC .......... *G01M 99/005* (2013.01); *G06N 20/00* (2019.01)

(58) Field of Classification Search
CPC ....... G01M 99/005; G06N 20/00; G06N 3/08; G05B 23/024; G05B 13/042; G01D 21/00; G06F 18/22; G06F 18/2433
See application file for complete search history.

(56) References Cited

U.S. PATENT DOCUMENTS

| | | | |
|---|---|---|---|
| 6,353,814 B1 | 3/2002 | Weng | |
| 8,626,459 B2 | 1/2014 | Di Scalea et al. | |
| 9,534,899 B2 | 1/2017 | Gutmann et al. | |
| 11,971,454 B2* | 4/2024 | Murphy | H01M 10/486 |
| 2018/0309770 A1* | 10/2018 | Han | G06N 20/00 |
| 2019/0391038 A1 | 12/2019 | Kitai et al. | |
| 2020/0285997 A1* | 9/2020 | Bhattacharyya | G06N 7/01 |
| 2020/0410042 A1 | 12/2020 | Hiroe et al. | |
| 2021/0201191 A1 | 7/2021 | Chowdhary et al. | |
| 2024/0289091 A1* | 8/2024 | Suleiman | G06F 7/08 |

OTHER PUBLICATIONS

Theiler et al., "Onboard CubeSat data processing for hyperspectral detection of chemical plumes," Proceedings of SPIE, vol. 10644, May 8, 2018, 12 pages.

* cited by examiner

*Primary Examiner* — Manuel A Rivera Vargas
(74) *Attorney, Agent, or Firm* — Seed Intellectual Property Law Group LLP

(57) ABSTRACT

A sensor unit is coupled to a machine and configured to detect anomalous behavior of the machine. The sensor unit includes a low power microcontroller that learns to recognize a plurality of operations of the machine. The sensor unit generates mean vector and inverse of a Cholesky decomposition matrix for each operation. During a detection mode the sensor unit computes a Mahalanobis distance for each feature vector, mean vector and first matrix. The sensor unit detects anomalous behavior or classifies the operation of the machine based on the Mahalanobis distances.

18 Claims, 7 Drawing Sheets

$$F = \begin{bmatrix} f_1 \\ f_2 \\ f_3 \end{bmatrix}$$

FIG. 2B $$M = \begin{bmatrix} \overline{f}_1 \\ \overline{f}_2 \\ \overline{f}_3 \end{bmatrix}$$

FIG. 2C $$C = \begin{bmatrix} v_1 & cv_{12} & cv_{13} \\ cv_{21} & v_2 & cv_{23} \\ cv_{31} & cv_{32} & v_3 \end{bmatrix}$$

FIG. 2D $$L^{-1} = \begin{bmatrix} \ell_1 & 0 & 0 \\ \ell_{21} & \ell_2 & 0 \\ \ell_{31} & \ell_{32} & \ell_3 \end{bmatrix}$$

FIG. 2E

SENSOR UNIT WITH ON-DEVICE LEARNING AND ANOMALY DETECTION

BACKGROUND

Technical Field

The present disclosure is related to low-power sensor units, and more particularly, to sensor units coupled to machines.

Description of the Related Art

Sensors can be used in a variety of applications. For example, sensors can be utilized to assist electronic devices or machines in their operations. In some cases, machines may not have advanced sensor systems to assist in their operations. The prospect of replacing these machines or devices with machines or devices that include advanced sensor systems can be expensive or otherwise unfeasible. However, failure to equip such machines with advanced sensor systems can also result in breakdown or other types of device failure that could possibly be avoided if a sensor system was present.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a sensor unit that can be equipped on machines or other devices and that can efficiently and effectively detect anomalous operation. The sensor unit includes an onboard sensor processing unit that can learn to recognize one or more standard operating modes of a machine or device. After the learning process is complete, the sensor processing unit can detect anomalous behavior of the machine when new sensor data does not align with any previously learned operating modes.

The sensor processing unit can include a very low power microcontroller capable of operating in a learning mode and a detection mode. In the learning mode, the microcontroller receives sensor data while the machine operates in a standard operating mode. The microcontroller generates one or more classification vectors or matrices by processing the sensor data. One or more classification vectors or matrices can be generated for each of a plurality of operating modes. In the detection mode, the microcontroller receives new sensor data and generates a feature vector from the new sensor data. The microcontroller computes a respective Mahalanobis distance for the feature vector and each of the one or more classification vectors or matrices. The Mahalanobis distance is a measure of the distance between a point P and a distribution D. Reference throughout the specification and claims to "Mahalanobis distance for a feature vector and one or more classification vector or matrices" may correspond to a distance between a point P (feature vector) and a distribution D (one or more classification vector or matrices). The microcontroller identifies the smallest Mahalanobis distance and compares the smallest Mahalanobis distance to a threshold value. If the smallest Mahalanobis distance is less than the threshold value, then the microcontroller determines that the machine is operating properly in the operating mode associated with the smallest Mahalanobis distance. If the smallest Mahalanobis distance is not less than the threshold value, then the microcontroller determines that the machine is operating in an anomalous manner.

When the low power microcontroller determines that the machine is operating in an anomalous manner, the microcontroller can output a warning, a flag, or other type of indication that machine is operating in an anomalous manner. Technicians can then perform inspection, maintenance, or repair on the machine. Because the microcontroller can detect anomalous behavior rapidly and with a high degree of sensitivity, it is likely that maintenance or repair can be performed before the machine suffers serious damage.

In one embodiment, during the learning mode, a sensor of the sensor unit generates a plurality of samples of sensor data while the machine is in a selected operating mode. The sensor processing unit generates a feature vector for each sample of the sensor data. The sensor processing unit generates a mean vector from the plurality of feature vectors. The sensor processing unit also generates a covariance matrix from the plurality of feature vectors. The sensor processing unit then generates a classification matrix corresponding to the inverse Cholesky decomposition of the covariance matrix. The mean vector and the classification matrix are stored for the selected operating mode. A respective mean vector and classification matrix can be generated for each of a plurality of operating modes of the machine.

In one embodiment, during the detection mode the sensor generates new sensor data. The sensor processing unit generates a new feature vector from the new sensor data. The sensor processing unit then computes, for each previously learned operating mode, the squared Mahalanobis distance for the feature vector and the corresponding mean vector and classification matrix. The sensor processing unit then classifies the operating mode of the machine or detects anomalous behavior based on the smallest squared Mahalanobis distance.

In one embodiment, a method includes receiving, at a sensor unit coupled to a machine, a request to train the sensor unit to recognize a first operation of the machine, generating first sensor data with a sensor of the sensor unit while the machine performs the first operation, and generating a mean vector based on the first sensor data. The method includes generating a first matrix corresponding to a covariance matrix based on the first sensor data and generating a second matrix corresponding to an inverse of a Cholesky decomposition of the first matrix.

In one embodiment, a method includes generating, with a sensor unit coupled to a machine, a respective mean vector and first matrix for each of a plurality of operations of the machine and generating sensor data with the sensor unit. The method includes, for each mean vector and first matrix, computing a respective Mahalanobis distance value for each feature vector and the corresponding mean vector and first matrix, and determining that the machine is operating in an anomalous state if all of the Mahalanobis distance values are greater than a threshold value.

In one embodiment, a sensor unit includes a plurality of sensors and a sensor processing unit coupled to the plurality of sensors. The sensor processing unit is configured to operate in a learning mode and in a detection mode. In the learning mode the sensor processing unit is configured to generate a mean vector and a first matrix based on first sensor data received from the plurality of sensors while a machine performs a first operation. In the detection mode the sensor processing unit is configured to receive second sensor data from the plurality of sensors, generate a feature vector based on the second sensor data, and compute a squared Mahalanobis distance based on the feature vector and the mean vector and the first matrix.

BRIEF DESCRIPTION OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

FIGS. 2B-2E are vectors and matrices associated with a sensor processing unit, according to one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
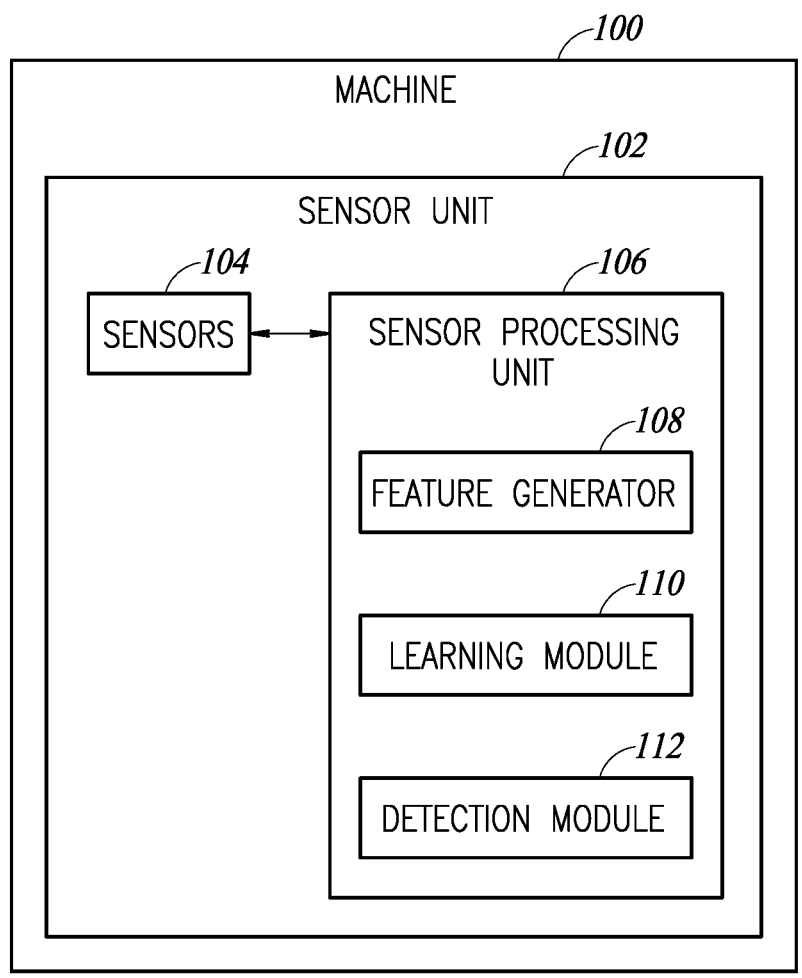
FIG. 1 is a block diagram of a machine including a sensor unit, according to one embodiment.

FIG. 1 is a block diagram of a machine 100, according to one embodiment. The machine 100 includes a sensor unit 102. The sensor unit 102 can generate and process sensor data based on the operation of the machine 100. As will be set forth in more detail below, the components of the sensor unit 102 cooperate to effectively and efficiently learn to recognize one or more operating modes of the machine 100 and to detect when the machine 100 is operating anomalously.

In one embodiment, the machine 100 includes one or more moving parts or is a machine that otherwise moves during its operation. The machine can include an industrial machine, a machine that moves material from one location to another, or a machine that processes material. In one embodiment, the machine can include a household appliance such as a coffee maker, a washing machine, a dryer, a dishwasher, a mixer, a blender, a microwave oven, or other types of machines. Moving parts can include a fan, a motor, a servo, wheels, or other types of moving parts. Principles of the present disclosure can also extend to machines or electronic devices that do not include moving parts. Principles of the present disclosure can extend to sensing or monitoring aspects other than motion or in addition to motion. Such other aspects can include temperature, pressure, electrostatic charge variation, voltage, current, or other types of parameters than can be indicative of an operational mode of a machine or device.

In one embodiment, the machine 100 includes one or more standard operating modes. The machine 100 may operate in the various operating modes at different times. For example, an industrial machine may have a material receiving mode in which material is loaded into the industrial machine. The industrial machine may have a transport mode in which the industrial machine moves material from one location to another on a track. The industrial machine may have a rotational load in which the industrial machine performs a rotation. The industrial machine may operate in any of these modes at different times. Each of these modes may have characteristic movements. As another example, a blender may operate in a plurality of modes such as a puree mode, a smoothie mode, various blending speed modes, or other types of modes. The blender as a whole, or the blender's moving parts may have different characteristic motions in the various operating modes.

During the lifetime of the machine, the machine may deteriorate or breakdown. For example, a moving part within the machine may begin to deteriorate. Often times such deterioration is not noticeable until a serious breakdown occurs. The breakdown may ruin expensive parts or may entirely ruin the machine. It is beneficial to detect deterioration before serious damages done. Such detection can enable inspection, maintenance, or repair before serious damage or destruction can occur.

Deterioration of a machine may manifest in slight changes in the motion of the machine or the motion of moving parts in the machine. For example, a motor may rotate more slowly, normally smooth motion may become rough or jittery, or other phenomenon may occur that is difficult to detect with human senses. Replacing machines with a machine that comes pre-equipped with an expensive sensing device may be cost prohibitive or otherwise unfeasible.

The sensor unit 102 is able to detect anomalous behavior of the machine 100 and output a warning or other indication that the machine should be inspected. The sensor unit 102 is highly sensitive and can detect very small changes in operation. The small changes in operation may be indicative of deterioration of the machine or imminent breakdown. The sensor unit is able to detect such small variations long before they would be apparent to human senses. When the sensor unit 102 outputs a warning or indication of anomalous behavior, technicians can inspect the machine 100 and can perform maintenance, repair, or part replacement before serious damage is done to the machine.

In one embodiment, the sensor unit 102 is relatively small and uses very low power. Accordingly, the sensor unit 102 can be battery-operated and can be installed on the machine. Because the sensor unit 102 can be battery-powered, the sensor unit 102 can be placed on machines without the need of tapping into the power source of the machine, although in one embodiment a sensor unit can utilize the power source of the machine. The result is that machines can be easily retrofitted with the sensor unit 102, obviating the need to replace the machines with newer machines preinstalled with a built-in sensor.

The sensor unit 102 includes one or more sensors 104. The one or more sensors 104 can include inertial sensors. The sensors 104 can include an accelerometer. The accelerometer can include a three-axis accelerometer that senses motion in three mutually orthogonal axes. Alternatively, the accelerometer can include a single axis accelerometer or another type of accelerometer.

In one embodiment, the sensors 104 include a gyroscope. The gyroscope can include a three-axis gyroscope that senses rotation around three mutually orthogonal axes. Alternatively, the gyroscope can include a single axis gyroscope or another type of gyroscope.

In one embodiment, the sensors 104 may include multiple accelerometers, multiple gyroscopes, an accelerometer and a gyroscope, or multiple accelerometers and multiple gyroscopes. The sensors 104 may include various types and combinations of inertial sensors.

In one embodiment, the sensors 104 include a microelectromechanical system (MEMS) sensor. Accordingly, the accelerometers and gyroscopes described above can include MEMS accelerometers and gyroscopes. A single integrated circuit die may include a plurality of MEMS accelerometers and gyroscopes. Alternatively, accelerometers and gyroscopes may be implemented in separate integrated circuit dies.

The sensors 104 generates sensor data based on the motion of the sensors 104. The sensors 104 may initially generate analog sensor signals based on the motion of the sensors 104. The sensor unit 102 may include digital signal processing circuitry that receives the analog sensor signals and generates digital sensor data based on the analog sensor signals. This can include performing analog-to-digital conversion, signal filtering, and other types of digital signal conditioning.

In one embodiment, the sensors 104 include a temperature sensor. The temperature sensor can generate sensor signals indicative of the temperature of the machine or device 100, or indicative of the temperature at a particular part of the machine or device 100. The sensors 104 can include other types of sensors without departing from the scope of the present disclosure. For example, the sensors 104 can include pressure sensors, capacitance sensors, voltage sensors, current sensors, or other types of sensors that may monitor an aspect of the machine or device 100.

The sensor unit 102 includes a sensor processing unit 106. The sensor processing unit 106 receives the sensor data from the sensors and processes the sensor data. Alternatively, the sensor processing unit 106 may receive analog sensor signals from the sensors 104, convert the analog sensor signals into digital sensor data, and may then process the digital sensor data. Accordingly, unless the context dictates otherwise, description of the sensor processing unit 106 receiving sensor data from the sensors 104 can include reception of analog sensor signals from the sensors 104 and converting the analog sensor signals to digital sensor data.

The sensor processing unit 106 can include a microcontroller or another type of processing circuitry. In one example, the processing unit 106 includes a low power, low area microcontroller with a relatively small amount of memory. The memory can include flash, RAM, SRAM, DRAM or other types of memory.

In one embodiment, the sensor unit 106 includes a feature generator 108. The feature generator 108 receives the sensor data from the one or more sensors 104. The feature generator 108 may receive the sensor data in samples in accordance with a sampling rate of the sensors 104. In one example, the sensor 104 includes a three-axis accelerometer. A signal sample of sensor data includes an acceleration value for the x-axis, and acceleration value for the y-axis, and an acceleration value for the z-axis. In another example, the sensor 104 includes a three-axis accelerometer and a three-axis gyroscope. A single sample the sensor data includes an acceleration value for the x-axis, and acceleration value for the y-axis, and acceleration value for the z-axis, a rotational rate value about the x-axis, a rotational rate value about the y-axis, and a rotational rate value about the z-axis.

The feature generator 108 generates, for each sample of the sensor data, a feature vector. The feature vector may include the raw sensor data (i.e., a value for each value of the sensor data), a subset of the raw sensor data (i.e., selected values of the sensor data), one or more values generated by performing computations on the raw sensor data, or various combinations of computed features and raw sensor data. The feature vector has a dimension D corresponding to the number of data values in each feature vector.

In one embodiment, the feature generator 108 generates a variance data value for one or more of the data types in the raw sensor data. The variance data value can indicate how a particular data value changes for a selected number of recent sensor data samples. In one embodiment, the feature generator 108 generates a peak-to-peak data value for one or more of the data types in the raw sensor data. The peak-to-peak data value can indicate the difference in the maximum value and the minimum value for a particular data type for a selected number of recent sensor data samples. The feature generator 108 can generate other types of features without departing from the scope of the present disclosure.

The feature generator 108 enables a user to configure the types of data that will be included in each feature vector. For example, the feature generator enables a user to choose to use only the raw sample data for a feature vector, to choose to generate one or more features by performing computations on the raw sample data value, or to choose subsets of computed features and raw sensor data values.

The sensor processing unit 106 includes a learning module 110 and a detection module 112. The learning module 110 can be implemented in accordance with processing and memory resources of the sensor processing unit 106. The detection module 112 can be implemented in accordance with processing and memory resources of the sensor processing unit 106. While the learning module 110 and the detection module 112 are shown as separate modules, in practice, the learning module 110 and the detection module 112 may be part of a single module or may otherwise overlap with each other.

The sensor processing unit 106 can be selectively operated in a detection mode or in a learning mode. For example, a user or operator can provide commands to the sensor unit 102 indicating that the sensor unit 102 should be operated in the learning mode or in the detection mode. The sensor processing unit 106 then enters the learning mode or the detection mode, as the case may be.

In the learning mode, the learning module 110 learns to recognize one or more operating modes of the machine 100. Accordingly, the user operator can provide an input to the unit 102 indicating that the machine 100 is operating in a first operating mode and that the sensor unit 102 should learn to recognize the first operating mode. The one or more sensors 104 generate sensor data while the machine 100 is in the first operating mode. The sensors 104 can generate a plurality of samples of sensor data while the machine 100 is in the first operating mode.

In one embodiment, the learning phase can be started and stopped with an input to the machine 100 or sensor unit 102. For example, a first input to the machine 100 or sensor unit 102 may start the learning phase. A second input to the machine 100 or sensor unit 102 may stop the learning phase. In one embodiment, the number of sensor data samples used for the learning process can be configured by the user.

The feature generator 108 receives the successive samples of sensor data and generates a feature vector for each sample of the sensor data. As described previously, the types of data values included in the feature vector can be configured or selected by a user. The feature generator 108 provides the feature vectors to the learning module 110.

The learning module 110 receives the feature vectors and generates one or more classification vectors or matrices from the feature vectors. The classification vectors and matrices are based on the sensor data generated while the machine 100 is in the first operating mode. Accordingly, the classification vectors or matrices are indicative of the first operating mode. Generation of the classification vectors or matrices for the first operating mode of the machine 100 corresponds to learning to recognize the behavior of the first operating mode.

The learning module 110 advantageously generates one or more classification vectors and matrices in a manner selected to facilitate efficient computation. Furthermore, the characteristics of the classification vectors and matrices are selected to facilitate efficient recognition that the machine 100 is operating in the first operating mode or that the machine 100 is operating in an anomalous manner.

In one embodiment, the learning module 110 generates a mean vector based on the feature vectors for the first operating mode of the machine 100. The mean vector has the same dimensions as the feature vectors. In particular, the mean vector may include an average value of each data type in the feature vectors. As an example, if each feature vector includes an x-axis acceleration value, a y-axis acceleration value, and a z-axis acceleration value, then the mean vector includes the average of the x-axis acceleration values for each feature vector, the average y-axis acceleration value for the feature vectors, and the average z-axis acceleration value for the feature vectors. The mean vector corresponds to a classification vector for the first operating mode. The mean vector can be stored in memory of the sensor processing unit 106.

In one embodiment, the learning module 110 generates a covariance matrix based on the feature vectors generated for the first operating mode. The covariance matrix has dimensions of D×D, where D is the dimension of the feature vector. The covariance matrix includes the variance value for each data type in the feature vector, as well as a value indicating how each data type varies based on other data types.

In one embodiment, the learning module 110 generates a classification matrix corresponding to the inverse of a Cholesky decomposition of the covariance matrix. The inverse of the Cholesky decomposition is chosen for the classification matrix because it greatly reduces the computational resources needed in detection steps, described later. In particular, the inverse of the Cholesky decomposition matrix can be utilized to efficiently generate a Mahalanobis distance computation for classification and anomaly detection, as will be described in more detail below. Furthermore, the inverse of the Cholesky decomposition matrix is a lower (or upper) triangular matrix with only values of 0 above (or below) the diagonal of the matrix.

As set forth above, in one embodiment, the learning module 110 generates, for the first operating mode of the machine, a classification vector corresponding to the mean vector, and a classification matrix corresponding to the inverse of the Cholesky decomposition matrix. The learning module 110 can generate the classification vector and the classification matrix for each of a plurality of operating modes of the machine 100. In particular, for a second operating mode, the machine 100 is placed in the second operating mode and the sensors 104 generate sensor data while the machine is operating in the second operating mode. The learning module 110 generates the classification vector and the classification matrix in the same manner as described for the first operating mode. This can be performed for each of a plurality of the operating modes of the machine 100. After learning is complete, the sensor processing unit 106 will have generated a respective classification vector and classification matrix for each operating mode.

In the detection mode, the sensors 104 generate sensor data while the machine 100 is operating. The feature generator generates, for each sample of the sensor data, a feature vector. The feature vectors generated in the detection mode are of the same format as the feature vectors generated in the learning mode.

In one embodiment, the detection module 112 generates a Mahalanobis distance for each feature vector and the corresponding classification vector and classification matrix. The Mahalanobis distance is a scalar value. The smaller the value of the Mahalanobis distance, the better the feature vector lives within the corresponding learned operating mode. Accordingly, if there are N learned operating modes, the detection module 112 will generate a Mahalanobis distance for each operating mode based on the feature vector for that operating mode and a classification vector and a classification matrix for that operating mode.

As used herein, generating the Mahalanobis distance can include generating the square of the Mahalanobis distance. Generating the square of the Mahalanobis distance can be computationally advantageous, as computing the square root of the square of the Mahalanobis distance can be avoided. In embodiments in which the classification matrix is a lower triangular matrix or upper triangular matrix, calculating the square of the Mahalanobis distance is very efficient in terms of computational resources.

After the detection module 112 has generated the Mahalanobis distance for each operating mode, the detection module determines which Mahalanobis value is smallest. The detection module 112 may determine that the machine 100 is operating in the operating mode associated with the smallest Mahalanobis value.

In one embodiment, the detection module 112 compares the smallest Mahalanobis distance value to a threshold value. If the smallest Mahalanobis value is greater than the threshold value, then the detection module 112 determines that the machine 100 is operating in an anomalous state. The detection module 112 outputs a flag or other type of messenger warning indicating that the machine is operating in an anomalous state. In this manner, the detection module 112 can efficiently and effectively determine whether the machine 100 is operating in an anomalous state and notify it to the machine or user. In one embodiment, operating in an anomalous state corresponds to a malfunction of the machine 100. Accordingly, the detection module 112 can indicate that the machine 100 is malfunctioning or operating in a malfunction state. Various other processes components, and configurations of processes and components can be utilized by the sensor processing unit 106 to learn operating modes and detect anomalies without departing from the scope of the present disclosure.

Figure 2A:
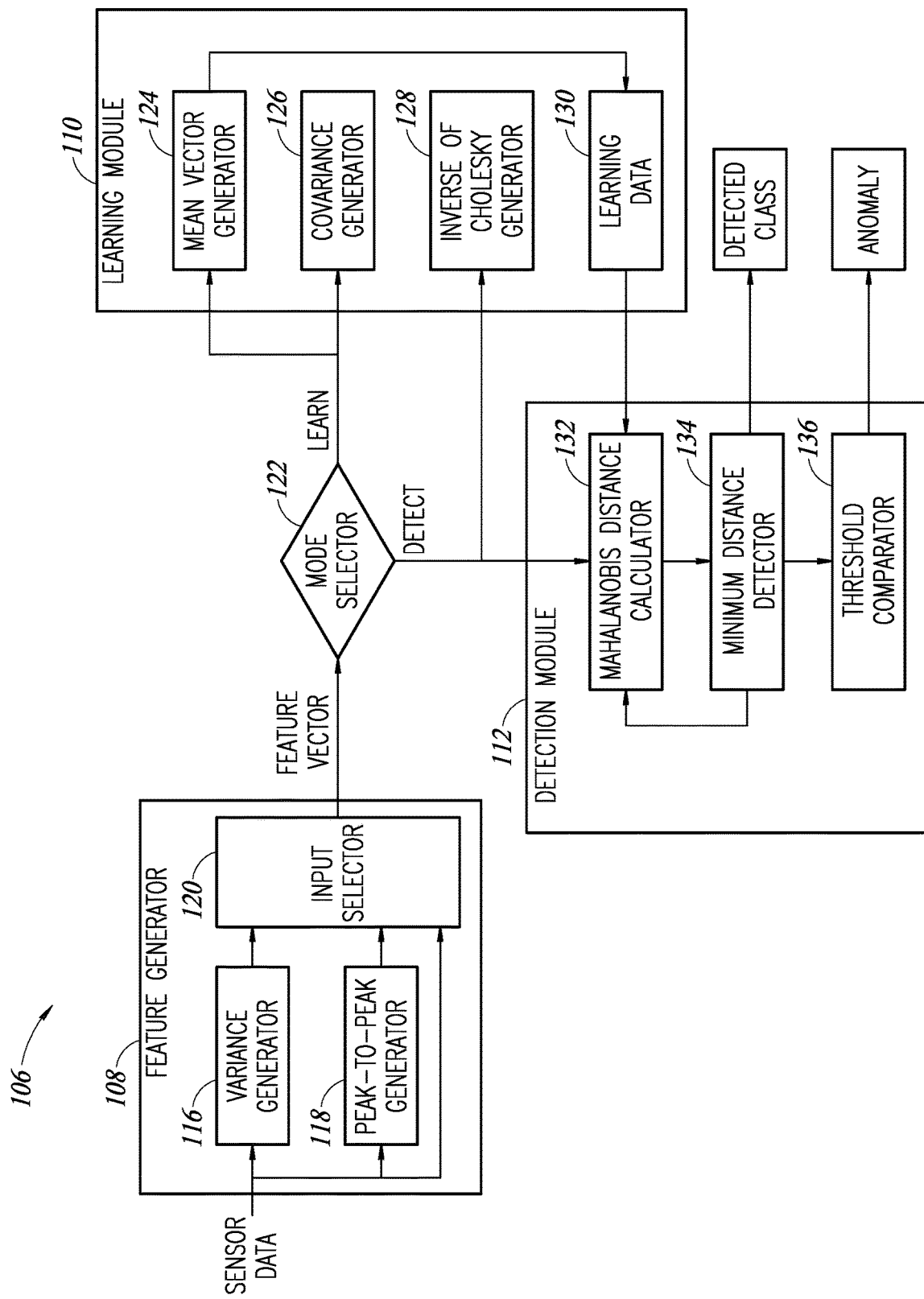
FIG. 2A is a functional block diagram of a sensor processing unit, according to one embodiment.

FIG. 2A is a functional flow diagram of a sensor processing unit 106, according to one embodiment. The sensor processing unit includes a feature generator 108. The feature generator 108 includes a variance generator 116, a peak-to-peak generator 118, and an input selector 120. The feature generator 108 receives sensor data and samples from the one or more sensors 104 as described in relation to FIG. 1. The sensor data is passed to the variance generator 116, the peak-to-peak generator 118, and to the input selector 120.

A user of the sensor unit 102 can configure the input selector 120 to generate feature vectors having particular features. For example, the input selector can be configured to generate a feature vector that includes the raw sensor data, variance values generated by the variance generator 116, peak-to-peak values generated by the peak-to-peak generator 118, or combinations of these. Furthermore, the feature generator 108 can generate other types of features from the sensor data without departing from the scope of the present disclosure.

FIG. 2B illustrates a feature vector F, according to one embodiment. The feature vector has a dimension D=3. In other words, the feature vector includes three data values f1, f2, and f3. In one example f1 is the x-axis accelerometer value, f2 is the y-axis accelerometer value, and f3 is the z-axis accelerometer value. The feature vector F can have a range other than three and can have other types of data values or other combinations of data values without departing from the scope of the present disclosure.

Returning to FIG. 2A, the sensor processing unit 106 includes a mode selector 122. The mode selector 122 can be configured according to a selection of the user to cause the sensor processing unit 106 to operate in either the learning mode or the detection mode. The learning mode will be described first.

In the learning mode, the machine 100 is placed in a selected operating mode. The sensor 104 generates a selected number of samples of sensor data, or keeps generating samples of sensor data until the machine or the user selects the detection mode. The feature generator 108 generates a feature vector F for each sensor data sample. The feature vectors F are passed in sequence to the learning module 110.

The learning module 110 includes a mean vector generator 124. The mean vector generator 124 receives each of the feature vectors F and generates a mean vector M. The mean vector M has the same dimensions as the feature vectors. Each data value in the mean vector M has the average value of the corresponding data values from the feature vectors F.

FIG. 2C illustrates a mean vector M generated from a plurality of feature vectors F in which the feature vectors F have the same form as the feature vector F of FIG. 2B, according to one embodiment. Accordingly, the mean vector M has a first data value $\overline{f1}$, corresponding to the average of the values f1 of the feature vectors F, a second data value $\overline{f2}$, corresponding to the average of the values f2 of the feature vectors F, and a third data value $\overline{f3}$, corresponding to the average of the values f3 of the feature vectors F.

Returning to FIG. 2A, the learning module 110 includes a covariance generator 126. The covariance generator 126 generates a covariance matrix C based on the feature vectors F. The covariance matrix C has dimensions of D×D, where D is the dimension of the feature vectors. The covariance matrix C includes a diagonal having variance values for each data value of the feature vectors F. The covariance matrix C includes covariance values indicating how each of the datatypes in the feature vectors vary with each other.

FIG. 2D illustrates an example of a covariance matrix C, according to one embodiment. The covariance matrix C is a 3×3 matrix because the feature vectors F each have three data values. The diagonal of the covariance matrix C has values v1, v2, and v3, corresponding to the individual variances of the data values f1, f2, and f3 of the feature vectors F. The covariance matrix C has covariance values cv12, cv13, cv21, cv23, cv31, and cv32. Each covariance value indicates how a particular data value of the feature vectors varies based on another data value of the feature vectors. For example, cv12 indicates how the data value f1 co-varies based on the data value of f2, the data value cv21 indicates how the data value f2 co-varies based on the data value of f1, and so forth.

Returning to FIG. 2A, the learning module 110 includes an inverse of Cholesky generator 128. The inverse of Cholesky generator 128 receives the covariance matrix C and generates an inverse $L^{-1}$ of the Cholesky decomposition L of the covariance matrix C. $L^{-1}$ is a matrix of same dimensions as the covariance matrix C. $L^{-1}$ is computationally advantageous in future steps because it is a lower triangular matrix in which all values above the diagonal are 0. $L^{-1}$ is a classification matrix associated with the selected mode of operation of the machine 100.

FIG. 2E illustrates an example of a classification matrix $L^{-1}$, according to one embodiment. The classification matrix $L^{-1}$ is generated from the covariance matrix C of FIG. 2D. The classification matrix is a lower diagonal matrix in which all of the values above the diagonal are zero. The other values l1, l2, l3, l21, l31, and l32 have values based on the Cholesky decomposition of the covariance matrix C.

Returning to FIG. 2A, the learning module 110 includes learning data 130. The learning data can store, for each learned operating mode of the machine 100, a respective mean vector (classification vector) and the inverse of a Cholesky composition matrix (classification matrix) $L^{-1}$.

After all desired operation modes of the machine 100 have been learned by the learning module 110, the user can cause the mode selector 122 to place the sensor processing unit 106 in the detection mode. In the detection mode, the detection module 112 can detect the operating mode of the machine 100 based on current sensor data and the previously learned classification vectors and matrices.

The detection module 112 includes a Mahalanobis distance calculator 132. The Mahalanobis distance calculator 132 calculates the Mahalanobis distance MD of the feature vector F and the classification vector M and classification matrix $L^{-1}$, for each learned operating mode of the machine 100. The smaller the Mahalanobis distance MD for a particular operating mode, the more likely it is that the machine 100 is operating in that operating mode.

In one embodiment, the detection module 112 generates the Mahalanobis distance squared $MD^2$. The reason for this is that computing the square root of the square of the Mahalanobis distance can be avoided. Details regarding the computation of $MD^2$ are provided below.

First, let us define a value y, with the following relationship:

$$y = L^{-1} * x$$

where x is the difference between the feature vector F and the classification vector M, defined as below:

$$x = F - M$$

$MD^2$ can be calculated by the following relationship:

$$MD^2 = x^T * C^{-1} * x$$

where $x^T$ is the transpose of the vector x and $C^{-1}$ is the inverse of the covariance matrix C. Utilizing the definition of the Cholesky decomposition, the following relationship can be derived:

$$x^T * C^{-1} * x = x^T * (L * L^T)^{-1} * x = MD^2$$

where L is the Cholesky decomposition matrix and LT is the transpose of L. From this the following relationship can be derived:

$$x^T * (L^T)^{-1} * L^{-1} * x = x^T * (L^{-1})^T * L^{-1} * x = MD^2$$

From the above the following relationship can be derived:

$$x^T * (L^{-1})^T * L^{-1} * x = (L^{-1} * x)^T * (L^{-1} * x) = MD^2$$

Finally, an elegant computation for $MD^2$ with the following relationship can be derived:

$$(L^{-1} * x)^T * (L^{-1} * x) = \|y\|^2 = MD^2.$$

Accordingly, we can calculate the squared Mahalanobis distance $MD^2$ by computing the norm squared of y, where y is the product of the classification matrix $L^{-1}$ and the vector x. This is very computationally efficient and provides a reliable metric indicating how well the current feature vector aligns with the classification vector and the classification matrix.

The detection module 112 includes a minimum distance detector 134. After the Mahalanobis distance calculator 132 has calculated $MD^2$ between the current feature vector and each learned operating mode of the machine 100, the minimum distance detector 134 identifies which value of $MD^2$ is smallest. The minimum distance detector 134 identifies the detected class (detected operating mode) of the machine 100 based on which value of $MD^2$ was smallest.

In one embodiment, the detection module 112 includes a threshold comparator 136. The threshold comparator compares the smallest value of $MD^2$ with a threshold value. If $MD^2$ is larger than the threshold value, then the threshold comparator 136 outputs a flag or warning indicating that the machine 100 is in an anomalous state. This corresponds to the detection of an anomaly. The threshold value can be selected by a user.

In one embodiment, the mean and the co-moment matrix can be iteratively computed. The covariance matrix C may be finalized at the end of the learning phase, by dividing the co-moment matrix by the number of the samples or by the number of samples minus one to apply the Bessel's correction.

Figure 3:
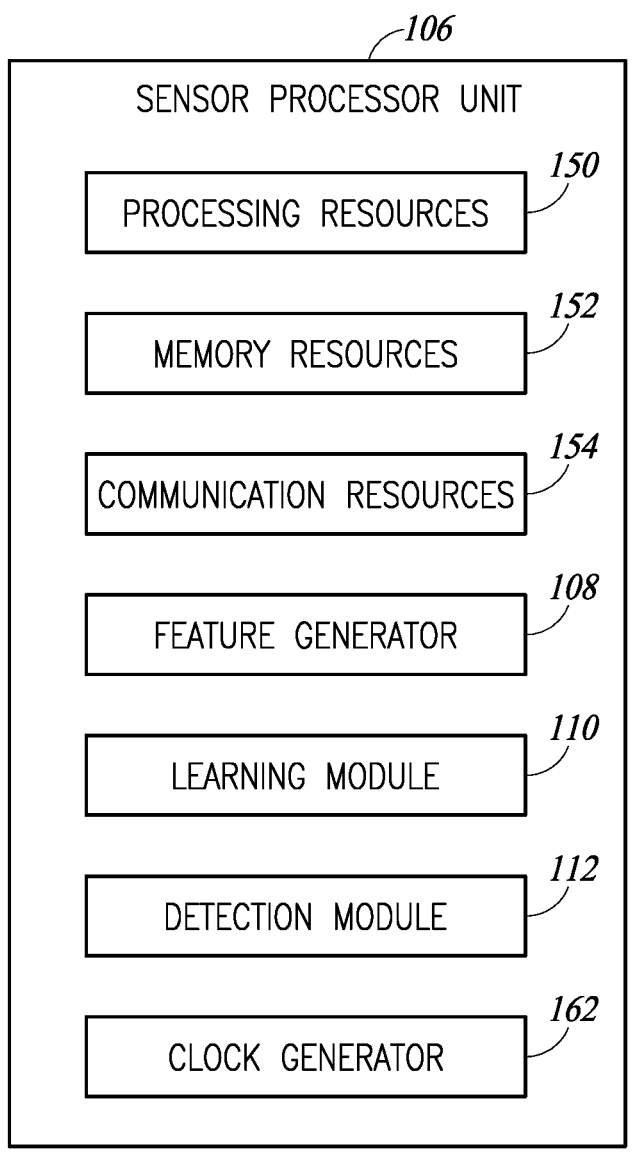
FIG. 3 is a block diagram of a sensor processing unit, according to one embodiment.

FIG. 3 is a block diagram of a sensor processing unit 106, according to one embodiment. The sensor processing unit includes processing resources 150. The processing resources 150 can correspond to the processing resources of a low-power microcontroller. The sensor processing unit 106 includes memory resources 152.

The memory resources 152 can include one or more buffers, registers, SRAMs, DRAMs, Flash memory arrays, or other types of memory. The memory resources 152 can store configuration data of the sensor processing unit 106, software instructions associated with the sensor processing unit 106, the various sensor data, vectors, and matrices described in relation to FIGS. 1-2E, and other data.

The communication resources 154 can include circuitry that facilitates communication between the components of the sensor processing unit 106. The communication resources 154 can also include circuitry that facilitates communication between the sensor processing unit 106 and external devices.

The sensor processing unit 106 includes the feature generator 108, the learning module 110, and the detection module 112, as described in relation to FIGS. 1-2E. The feature generator 108, the learning module 110, and the detection module 112 can be implemented using the processing resources 150, the memory resources 152 and the communication resources 154.

The sensor processing unit 106 may also include a clock generator 162. The clock generator 162 may generate a relatively slow clock speed due to the sensor processing unit 106 corresponding to a very low power microcontroller. In one example, the clock generator 162 has a clock speed of about 5 MHz. In one example, the sampling rate of the sensors 104 is about 400 Hz. The sensor processing unit 106 can have other components and combinations of components without departing from the scope of the present disclosure.

Figure 4:
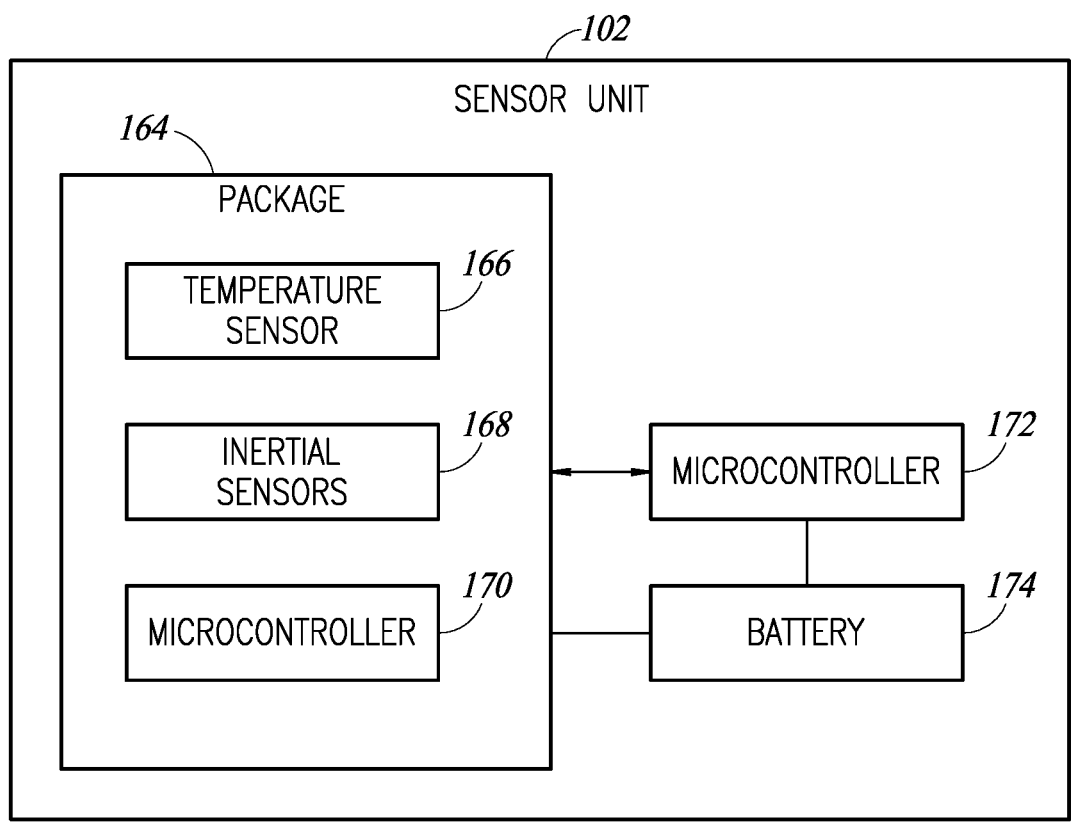
FIG. 4 is a block diagram of a sensor unit, according to one embodiment.

FIG. 4 is a block diagram of a sensor unit 102, according to one embodiment. The sensor unit 102 includes a package 164. The package 164 includes a temperature sensor 166 and one or more inertial sensors 168. The package 164 also includes a low-power microcontroller 170.

The temperature sensors 166 and the inertial sensors 168 may correspond to the sensors 104 of FIG. 1. The microcontroller 170 may correspond to the sensor processing unit 106 of FIG. 1. The temperature sensor 166, the inertial sensor 168, and the microcontroller 170 may be implemented on a single integrated circuit die and encapsulated in the package 164. In one embodiment, the inertial sensors 168 the temperature sensor 166, and the microcontroller 170 are implemented in separate dies within the package 166. Alternatively, some of the components of the package 164 may be implemented on a same integrated circuit die, while other components are implemented on other integrated circuit dies. Furthermore, the sensor unit may include multiple packages housing the sensors 166, 168 and the microcontroller 170.

In one embodiment, the sensor unit 102 includes a microcontroller 172. The microcontroller 172 is external to the package 164 and separate from the microcontroller 170. The microcontroller 172 may be a more powerful and complex microcontroller than the microcontroller 170. The microcontroller 172 can be utilized for interfacing between the microcontroller 170 and external devices. For example, when the microcontroller 170 is to be configured, the configuration process may be performed by a user via the microcontroller 172 that communicates with the microcontroller 170. Under normal circumstances, the microcontroller 172 may be asleep, may be powered off, or may otherwise be in a low-power mode until communication is needed with the microcontroller 170.

In one embodiment, the microcontroller 172 is asleep until the microcontroller 170 outputs a flag indicating that the machine 100 is operating in an anomalous state. The microcontroller 172 may then communicate with outside systems. The microcontroller 170 may output an interrupt signal to the microcontroller 172 that causes the microcontroller 172 to wake up. The microcontroller 172 can include wired or wireless communication resources to communicate with devices or systems external to the sensor unit 102. For example, the microcontroller 172 may include Wi-Fi communication functionality, Bluetooth communication functionality, or other types of wireless communication functionality.

In one embodiment, the sensor unit 102 includes a battery 174. The battery 174 powers the microcontroller 172 and the components of the package 164. In one embodiment, the components of the sensor unit 102 are implemented on a single circuit board with signal traces that facilitate communication between the components of the sensor unit 102. Alternatively, the components of the sensor unit 102 may be implemented on multiple circuit boards.

Figure 5:
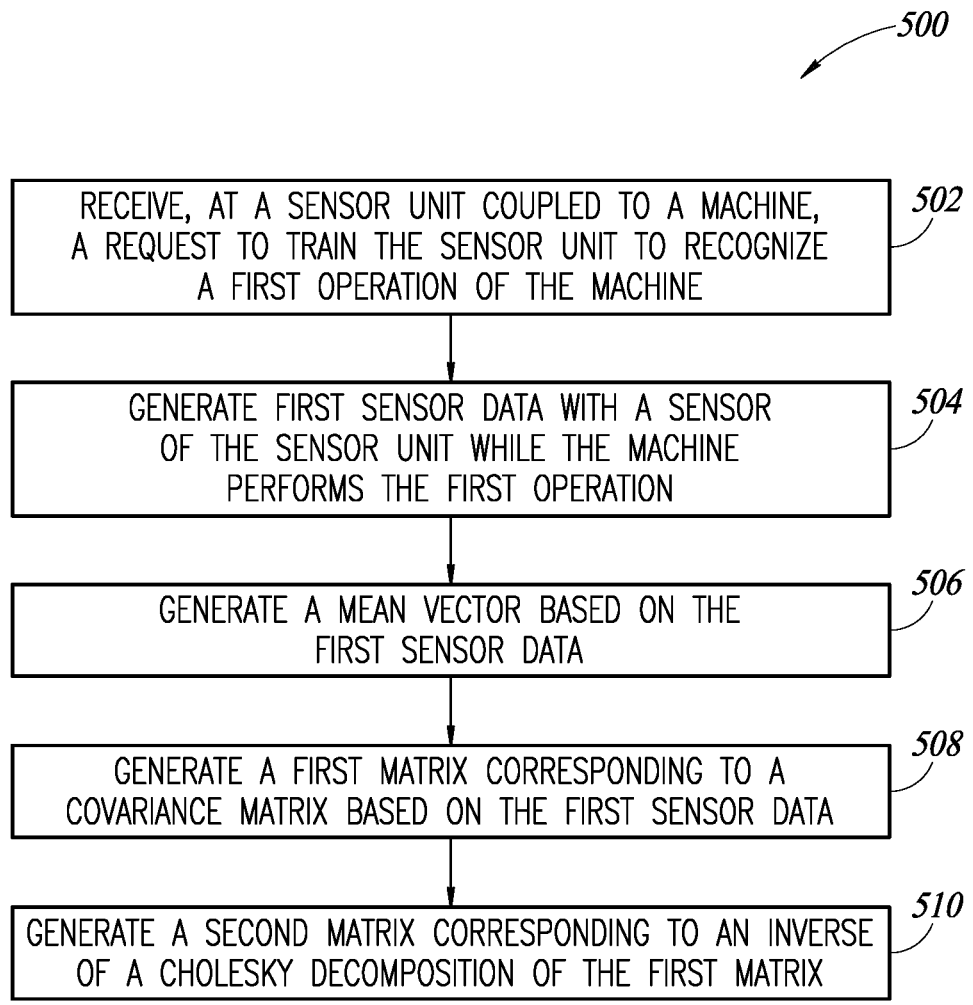
FIG. 5 is a flow diagram of a method for operating a sensor unit, according to one embodiment.

FIG. 5 is a flow diagram of a method 500 for operating a sensor unit, according to one embodiment. The method 500 can utilize systems, components, and processes described in relation to FIGS. 1-4. At 502, the method 500 includes receiving, at a sensor unit coupled to a machine, a request to train the sensor unit to recognize a first operation of the machine. At 504, the method 500 includes generating first sensor data with a sensor of the sensor unit while the machine performs the first operation at 506, the method 500 includes generating a mean vector based on the first sensor data. At 508, the method 500 includes generating a first matrix corresponding to a covariance matrix based on the first sensor data. At 510, the method 500 includes generating a second matrix corresponding to an inverse of a Cholesky decomposition of the first matrix.

Figure 6:
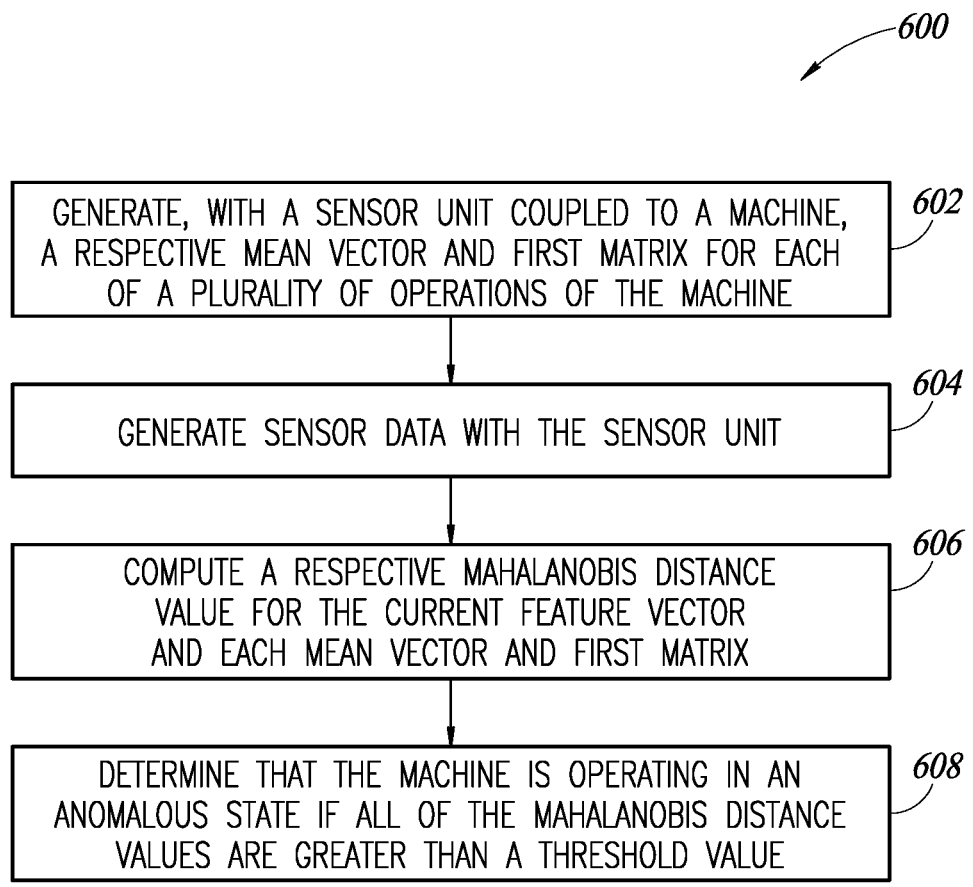
FIG. 6 is a flow diagram of a method for operating a sensor unit, according to one embodiment.

FIG. 6 is a flow diagram of a method 600 for operating a sensor unit, according to one embodiment. The method 600 can utilize systems, components, and processes described in relation to FIGS. 1-5. At 602, the method 600 includes generating, with a sensor unit coupled to a machine, a respective mean vector and first matrix for each of a plurality of operations of the machine. At 604, the method 600 includes generating sensor data with the sensor unit. At 606, the method 600 includes computing a respective Mahalanobis distance value for the current feature vector and each mean vector and first matrix. At 608, the method 600 includes determining that the machine is operating in an anomalous state if all of the Mahalanobis distance values are greater than a threshold value.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, with an inertial sensor of the sensor unit, a plurality of samples of first sensor data with a sensor of a sensor unit coupled to a machine;
receiving the plurality of samples of the first sensor data with a feature generator of the sensor unit;
generating, with the feature generator of the sensor unit, a first feature vector for each sample;
receiving the first feature vectors with a learning module of the sensor unit;
receiving, with a detection module of a first microcontroller of the sensor unit, an inverse of a Cholesky decomposition of a covariance matrix based on the first feature vectors;
generating, with the inertial sensor of the sensor unit, second sensor data;
receiving the second sensor data with feature generator;
generating a second feature vector with the feature generator based on the second sensor data;
receiving the second feature vector with the detection module; and
activating an interrupt from the first microcontroller of the sensor unit to a second microcontroller of the sensor unit indicating that the machine is operating in an anomalous state based, in part, on a Mahalanobis distance associated with the second feature vector and the inverse of Cholesky decomposition being greater than a threshold distance.

2. The method of claim 1, comprising generating a mean vector corresponding to a mean of the first feature vectors.

3. The method of claim 2, comprising generating variance values for each sample of the first feature data, wherein each first feature vector includes the variance values for the corresponding sample.

4. The method of claim 2, comprising generating peak-to-peak values for each sample of the first feature data, wherein each first feature vector includes the peak-to-peak values for the corresponding sample.

5. The method of claim 2, wherein each first feature vector includes the sensor data from the corresponding sample.

6. The method of claim 1, further comprising computing the square of the Mahalanobis distance.

7. The method of claim 1, comprising determining that the machine is operating anomalously if the Mahalanobis distance is greater than a threshold value.

8. A method, comprising:
generating, with an inertial sensor of the inertial sensor unit, a plurality of samples of first sensor data;

receiving the plurality of samples of the first sensor data with a feature generator of the sensor unit;
generating, with the feature generator of the sensor unit, a first feature vector for each sample;
receiving the first feature vectors with a learning module of the sensor unit;
receiving, with a detection module of a first microcontroller of the sensor unit, a plurality of inverse of a Cholesky decompositions of covariance matrices based on the first feature vectors, each inverse of Cholesky decomposition being associated with a respective operation of the machine;
generating, with the inertial sensor of the sensor unit, second sensor data;
receiving the second sensor data with feature generator;
generating a second feature vector with the feature generator based on the second sensor data;
receiving the second feature vector with the detection module; and
activating an interrupt from the first microcontroller to a second microcontroller of the sensor unit indicating that the machine is operating in an anomalous state based, in part, on each of a plurality of Mahalanobis distances associated with the second feature vector and the inverse of Cholesky decompositions being greater than a threshold distance.

9. The method of claim 8, comprising:
generating, with the inertial sensor of the sensor unit, third sensor data;
generating a third feature vector with the feature generator based on the third sensor data;
receiving the third feature vector with the detection module;
identifying a smallest Mahalanobis distance from a plurality of Mahalanobis distances associated with third feature vector and the inverse of Cholesky decompositions; and
determining that the machine is performing an operation corresponding to the inverse of Cholesky decomposition associated with the smallest Mahalanobis distance if the smallest Mahalanobis distance is smaller than the threshold distance.

10. The method of claim 8, comprising:
generating, with the sensor unit, a respective mean vector for each of a plurality of operations of the machine.

11. The method of claim 8, comprising generating variance values for each sample of the first feature data, wherein each first feature vector includes the variance values for the corresponding sample.

12. The method of claim 8, comprising generating peak-to-peak values for each sample of the first feature data, wherein each first feature vector includes the peak-to-peak values for the corresponding sample.

13. The method of claim 8, wherein each first feature vector includes the sensor data from the corresponding sample.

14. A sensor unit, comprising:
a plurality of inertial sensors coupled to a machine and configured to generate a plurality of samples of first sensor data in a learning mode and to generate second sensor data in a detection mode; and
a sensor processing unit coupled to the plurality of sensors and including a first microcontroller and a second microcontroller, the first microcontroller including:
a feature generator configured to:
receive, in the learning mode, the plurality of samples of the first sensor data:
generate, in the learning mode, a first feature vector for each sample;
receive, in the detection mode, the second sensor data; and
generate, in the detection mode, a second feature vector based on the second sensor data;
a detection module configured to:
receive, in the detection mode, an inverse of a Cholesky decomposition of a covariance matrix based on the first feature vectors;
receiving the second feature vector; and
activate an interrupt from the first microcontroller to the second microcontroller indicating that the machine is operating in an anomalous state based, in part, on a Mahalanobis distance associated with the feature vector and the inverse of Cholesky decomposition being greater than a threshold distance.

15. The sensor unit of claim 14, wherein the plurality of inertial sensors includes at least one accelerometer.

16. The sensor unit of claim 15, wherein the plurality of inertial sensors includes at least one gyroscope.

17. The sensor unit of claim 16, further comprising at least one temperature sensor.

18. The sensor unit of claim 14, wherein the sensor processing unit is configured to determine whether or not the machine is operating anomalously based on a square of the Mahalanobis distance.

* * * * *